United States Patent Office 3,487,044
Patented Dec. 30, 1969

3,487,044
THIODIPROPIONATES AND PHENOLIC STABILIZED POLYOLEFIN COMPOSITIONS
Clarence E. Tholstrup, Kingsport, Tenn., assignor to Eastman Kodak Company, Rochester, N.Y., a corporation of New Jersey
No Drawing. Continuation-in-part of application Ser. No. 850,985, Nov. 5, 1959. This application Sept. 23, 1968, Ser. No. 761,825
Int. Cl. C08f *45/58*
U.S. Cl. 260—45.85    13 Claims

ABSTRACT OF THE DISCLOSURE

A combination comprising a dialkyl thiodipropionate and an alkylidene bisphenolic compound or alkylene bisphenolic compound is useful as a synergistic stabilizer system for polyolefins.

---

This application is a continuation-in-part of application Ser. No. 850,985, filed Nov. 5, 1959, now abandoned.

This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, often times expose the poly-α-olefin to elevated temperatures. To minimize oxidative deterioration in poly-α-olefins, antioxidants or stabilizers are often times incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel polyethylene and polypropylene compositions containing synergistic combinations of compounds that improve the stability of polyethylene and polypropylene compositions against deterioration resulting from exposure to elevated temperatures.

Other objects of the invention will be apparent from the description and claims that follow.

The present invention relates to a synergistic stabilizer system comprising a combination of a diester of 3,3'-thiodipropionic acid and an alkylidenebisphenol or an alkylenebisphenol and the use of such stabilizer system in stabilizing polyolefins.

The diesters of 3,3'-thiodipropionic acid comprising the present stabilizer combination have the following formula

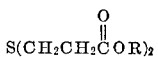

wherein R is an alkyl radical having at least 4 and generally 4 to 20 carbon atoms, with 8 to 18 carbon atoms being preferred. A particularly effective ester has twelve carbon atoms for the R substituent, namely, dilauryl-3,3'-thiodipropionate. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, cetyl, heptadecyl, stearyl, and eicosyl diesters of 3,3'-thiodipropionic acid, or mixtures thereof.

A wide variety of alkylenebisphenols and alkylidenebisphenols can be effectively utilized in combination with the described diesters of 3,3'-thiodipropionic acid, including those having the following general formulas:

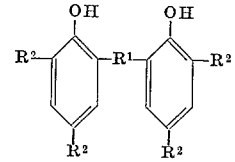

and

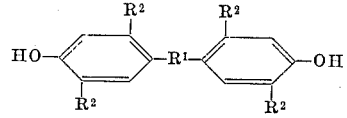

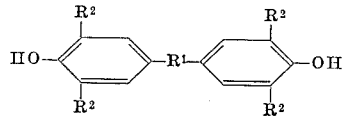

In the above bisphenol formulas: $R^1$ is either an alkylidene radical or an alkylene radical usually having 1 to 12 carbon atoms, more generally 4 to 12 carbon atoms with 4 being preferred, and typically having the formulas

or —$(CH_2)_n$— wherein R is a hydrogen atom or an alkyl radical and $n$ is an integer consistent with the above criterion; and each $R^2$, independently, is a hydrogen atom, an alkyl radical usually having 1 to 12 carbon atoms and preferably 1 to 4 carbon atoms, a 1-alkylcyclohexyl radical wherein the alkyl moiety usually has 1 to 4 carbon atoms and preferably is methyl, or a 1-alkylbenzyl radical wherein the alkyl moiety usually has 1 to 4 carbon atoms and preferably is methyl. At least one $R^2$ on each aromatic ring is other than a hydrogen atom in the above bisphenol formulas.

Typical bisphenols that can be suitably employed in combination with dialkyl-3,3'-thiodipropionates include such 2,2'-alkylene or alkylidene bis(4 and/or 6-substituted phenols) as:

2,2'-methylenebis(4-methyl-6-tert.-butylphenol),
2,2'-methylenebis(4-methyl-6-tert.-octylphenol),
2,2'-methylenebis(4-methyl-6-tert.-dodecylphenol),
2,2'-methylenebis(6-tert.-butylphenol),
2,2'-methylenebis(4-tert.-dodecyl-6-methylphenol),
2,2'-methylenebis(4,6-tert.-dodecylphenol),
2,2'-methylenebis(4-methyl-6-amylphenol),
2,2'-methylenebis[4-methyl-6-(1-methylbenzyl)phenol],
2,2'-methylenebis[4-methyl-6-(1-methylcyclohexyl) phenol],
2,2'-ethylidenebis(4,6-diamylphenol),
2,2'-ethylidenebis(4-tert.-butyl-6-tert.-octylphenol),
2,2'-isopropylidenebis(4-tert.-butyl-6-n-dodecylphenol),
2,2'-isopropylidenebis(4,6-di-n-octylphenol), 2,2'-n-butylidenebis(4-methylphenol),
2,2'-n-butylidenebis[4-methyl-6-(1-methylbenzyl)phenol],
2,2'-isobutylidenebis [6-(1-n-butylcyclohexyl)phenol],
2,2'-n-decamethylenebis(4-methylphenol),
2,2'-n-dodecamethylenebis(4-tert.-butyl-6-methylphenol), and related 2,2'-alkylene or ankylidenebis(4 and/or 6- substituted phenols).

Other typical bisphenols that can be suitably employed in combination with dialkyl-3,3'-thiodipropionates include such 4,4'-alkylidene or alkylene bis (3 and/or 6- substituted phenols) as:

4,4'-methylenebis(3-methyl-6-tert.-butylphenol),
4,4'-methylenebis(3-ethyl-6-tert.-octylphenol),
4,4'-methylenebis(3-methyl-6-tert.-dodecylphenol),
4,4'-methylenebis(6-tert.-butylphenol),
4,4'-methylenebis(3-tert.-dodecyl-6-methylphenol),
4,4'-methylenebis(3,6-di-tert.-dodecylphenol),
4,4'-methylenebis(3-methylphenol),
4,4'-methylenebis[3-methyl-6-(1-ethylbenzyl)phenol],
4,4' - methylenebis[3-methyl-6-(1-iso - butylcyclohexyl)- phenol],
4,4'-methylenebis[3-methyl-6-(1-methylbenzyl)phenol],
4,4'-ethylidenebis(3,6-diamylphenol),
4,4'-ethylidenebis(3-tert.-butyl-6-tert.-octylphenol),
4,4'-isopropylidenebis(3-tert.-butyl-6-n-dodecylphenol),
4,4'-isopropylidenebis(3,6-di-n-octylphenol),
4,4'-n-butylidenebis(3-methylphenol),
4,4'-n-butylidenebis(3-methyl-6-tert.-butylphenol),
4,4' - n - butylidenebis[3-methyl-6-(1-methylcyclohexyl)- phenol],
4,4' - n - butylidenebis[3-methyl-6-(1-tert.-butylbenzyl)- phenol],
4,4'-isobutylidenebis(3,6-di-n-octylphenol),
4,4'-isobutylidenebis[6-(1-n-butylcyclohexyl)phenol],
4,4'-n-decamethylenebis(3-methylphenol),
4,4'-n-dodecamethylenebis(3-tert.-butyl-6-methylphenol), and related 4,4'-alkylene or alkylidenebis (3 and/or 6- substituted phenols).

Additional suitable bisphenols that can be employed in combination with dialkyl-3,3'-thiodipropionates include such 4,4'-alkylidene or alkylene bis(2 and/or 6- substituted phenols) as:

4,4'-methylenebis(2-methyl-6-tert.-butylphenol),
4,4'-methylenebis(2-ethyl-6-tert.-octylphenol),
4,4'-methylenebis(2-methyl-6-tert.-dodecylphenol),
4,4'-methylenebis(6-methylphenol),
4,4'-methylenebis(2-tert.-dodecyl-6-methylphenol),
4,4'methylenebis(2,6-di-tert.-dodecylphenol),
4,4'methylenebis(2-methylphenol),
4,4'-methylenebis[2-methyl-6-(1-ethylbenzyl)phenol],
4,4' - methylenebis[2-methyl-6-(1-iso - butylcyclohexyl)- phenol],
4,4'-methylenebis[2-methyl-6-(1-methylbenzyl)phenol],
4,4'-ethylidenebis(2,6-di-tert.-butylphenol),
4,4'-isopropylidenebis(2-tert.-butyl-6-n-dodecylphenol),
4,4'-isopropylidenebis(2,6-di-n-octylphenol),
4,4'-n-butylidenebis(2-methylphenol),
4,4'-n-butylidenebis(2-methyl-6-tert.-butylphenol),
4,4' - n - butylidenebis[2-methyl-6-(1-methylcyclohexyl)- phenol],
4,4' - n - butylidenebis[2-methyl-6-(1-tert.-butylbenzyl)- phenol],
4,4'-isobutylidenebis(2,6-di-n-octylphenol),
4,4'-isobutylidenebis[6-(1-n-butylcyclohexyl)phenol],
4,4'-n-decamethylenebis(2-methylphenol),
4,4'-n-dodecamethylenebis(2-tert.-butyl-6-methylphenol), and related 4,4' - alkylenebis(2 and/or 6 - substituted phenols).

The combination of the described diesters of 3,3'-thiodiproprionic acid and bisphenols can be used to stabilize a wide variety of solid poly-α-olefin compositions against deterioration resulting from exposure to elevated temperatures. Any of the normally solid polymers of α-mono- olefinic aliphatic hydrocarbons containing 2 to 10 carbon atoms can be stabilized in accordance with the invention. The subject stabilizer combinations are preferably used in polyethylene and polypropylene as well as copolymers thereof, although such poly-α-olefins as poly(3-methylbutene-1), poly(4-methylpentene-1), poly(pentene-1), poly(3,3-dimethylbutene-1), poly(4,4-dimethylbutene-1), poly(octene-1), poly(decene-1), polystyrene and the like can also be stabilized with the subject stabilizer combinations. Both the so-called "low density" and "high density" or high crystallinity poly-α-olefin compositions can be stabilized in accordance with the invention. High density poly-α-olefins generally have a crystallinity of at least 85% and more usually at least 90% as determined by X-ray diffraction. Reference is made to Fawcett et al. U.S. Patent No. 2,153,553 granted Apr. 11, 1939, and to copending applications Coover U.S. Ser. No. 559,536 filed Jan. 17, 1956, now abandoned and Coover et al. U.S. Ser. No. 724,904, filed Mar. 31, 1958, now abandoned, with regard to the preparation of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the combination of the diester of 3,3'-thiodipropionic acid and the bisphenol employed in poly-α-olefin compositions in accordance with the invention can be widely varied, the stabilizing amount of this combination usually varying with the particular use to which the poly-α-olefin compositions are to be put. Concentrations of at least about .001% of each stabilizer component are suitable, although about .001% to 5% of each stabilizer component are generally used, with about .01% to 3% of the diester of 3,3'-thiodipropionic acid and about .01% to 1% of the bisphenol being preferred, the concentration being based on the weight of the poly-α-olefin. We generally utilize the combination of the subject stabilizers at a weight ratio of the diester of 3,3'-thiodiproprionic acid to the bisphenol in the range of 1/100 to 100/1, and preferably 1/50 to 50/1.

The stabilizer combinations of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

It is often times desirable to employ at least .01% and usually .01% to 3% by weight of the poly-α-olefin of an organic phosphite with the present synergistic stabilizer combinations. Preferred phosphites are secondary and tertiary phosphites having the formulas of

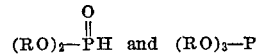

wherein R is an alkyl radical of desirably 1–10 carbon atoms, an aryl radical or an alkyl-substituted aryl radical. Typical of the organic phosphites that can be employed include mono (p-tertiary amyl phenyl) phosphite, mono (p-1,1,3,3-tetramethyl butyl phenyl) phosphite, monophenyl phosphite, di(4-methyl-2-ethylpentyl)hydrogen phosphite, di(2-ethylhexylhydrogen phosphite, diphenyl hydrogen phosphite, dicresyl hydrogen phosphite, di(n-butyl)phenyl phosphite, triphenyl phosphite, tricresyl phosphite, tris(2-ethylhexyl) phosphite, tris(4-methyl-2-ethylpentyl)hydrogen phosphite, tris[4-(1,1,3,3-tetramethylbutyl)phenyl] phosphite and related organic phosphites. The stabilization of certain poly-α-olefins with phosphites is disclosed in further detail in copending Joyner and Coover application U.S. Ser. No. 681,897 which was filed Sept. 4, 1957 and is now abandoned.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combination of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about .5 to 100 mils in thickness. The present compositions can be used for coating paper, wire, metal foil, glass fiber fabrics, synthetic and natural textiles or fabrics, and other such materials.

The subject stabilizer combinations of dialkyl esters of 3,3′-thiodipropionic acid and bisphenols are synergistic combinations, namely, the stabilizing effect of such combinations in poly-α-olefins is substantially greater than the additive effect of the individual stabilizers of the combination.

The invention is illustrated by the following examples of preferred embodiments thereof. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven-exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002% sodium thiosulfate. The peroxide concentration, P, in milliequivalents per kilogram of polymer is given by the expression $P = 8S$, where S is the number of millilters of 0.002% sodium thiosulfate used.

Example 1

Several samples of powdered polypropylene were mixed with dialauryl-3,3′-thiodipropionate and several typical bisphenols of the invention, compression molded into plates 1/16 inch in thickness, and the resulting molded samples evaluated with respect to stability by the 160° C. oven storage test described above. The polypropylene was a plastic grade solid polypropylene having a density of about 0.91 and an average molecular weight greater than 15,000. The results of the stability tests are summarized by the data set out in Tables A and B below. The data summarized in Table A concerns polypropylene having an inherent viscosity of about 1.72 and the data summarized in Table B concerns polypropylene having an inherent viscosity of about 1.73, the inherent viscosities having been determined in Tetralin at 145° C. Samples of the individual components of the various stabilizer combinations in the polypropylene, as well as the polypropylene with no additive, were included in the stability test for purposes of comparison. The diluaryl-3,3′-thiodipropionate additive is indicated in Tables A and B as "DLTDP." The concentrations in Tables A and B are based on the weight of the polypropylene.

TABLE A

| Additive | Oven life at 160° C., hours |
|---|---|
| None | 0.2 |
| 0.1% DLTDP | 2 |
| 0.05% 4,4′-methylenebis[3-methyl-6-(1-methylbenzyl)phenol] | 3 |
| 0.1% DLTDP plus 0.05% 4,4′-methylenebis[3-methyl-6-(1-methylbenzyl)phenol] | 320 |
| 0.05% 4,4′-ethylidenebis(3-methyl-6-tert.-octylphenol) | 7 |
| 0.1% DLTDP plus 0.05% 4,4′-ethylidenebis(3-methyl-6-tert. octylphenol) | >150 |
| 0.05% 4,4′-ethylidenebis[3-methyl-6-(1-methylcyclohexyl)phenol] | 8 |
| 0.1% DLTDP plus 0.05% ethylidenebis[3-methyl-6-(1-methylcyclohexyl)phenol] | >170 |
| 0.1% 4,4′-n-butylidenebis(3-methyl-6-tert.-butylphenol) | 7 |
| 0.1% DLTDP plus 0.05% 4,4′-n-butylidenebis(3-methyl-6-tert.-butylphenol) | 200 |
| 0.05% 4,4′-n-butylidenebis[3-methyl-6-(1-methylbenzyl)phenol] | 4 |
| 0.1% DLTDP plus 0.05% 4,4′-n-utbylidenebis[3-methyl-6-(1-methylbenzyl)phenol] | 320 |
| 0.05% 4,4′-n-butylidenebis[3-methyl-6-(1-methylcyclohexyl)phenol] | 7 |
| 0.1% DLTDP plus 0.05% 4,4′-n-butylidenebis[3-methyl-6-(1-methylcyclohexyl)phenol] | >170 |
| 0.05% 2,2′-methylenebis(4-methyl-6-tert.-octylphenol) | 15 |
| 0.1% DLTDP plus 0.05% 2,2′-methylenebis(4-methyl-6-tert.-octylphenol) | 80 |
| 0.05% 2,2′-methylenebis[4-methyl-6-(1-methylbenzyl)phenol] | 20 |
| 0.1% DLTDP plus 0.05% 2,2′-methylenebis[4-methyl-6-(1-methylbenzyl)phenol] | 250 |
| 0.05% 2,2′-ethylidenebis[4-methyl-6-(1-methylcyclohexyl)phenol] | 7 |
| 0.1% DLTDP plus 0.05% 2,2′-ethylidenebis[4-methyl-6-(1-methylcyclohexyl)phenol] | 110 |
| 0.01% 2,2′-n-butylidenebis[4-methyl-6-(1-methylbenzyl)phenol] | 10 |
| 0.1% DLTDP plus 0.05% 2,2′-n-butylidenebis[4-methyl-6-(1-methylbenzyl)phenol] | 170 |

TABLE B

| Additive | Oven life at 160° C., hours |
|---|---|
| None | 0.2 |
| 0.1% DLTDP | 2 |
| 0.2% DLTDP | 3 |
| 0.05% 2,2′-methylenebis(4-methyl-6-tert.-octylphenol) | 15 |
| 0.2% DLTDP plus 0.05% 2,2′-methylenebis(4-methyl-6-tert.-octylphenol) | 50 |
| 0.05% 2,2′-n-decamethylenebis(4-methylphenol) | 18 |
| 0.2% DLTDP plus 0.05% 2,2′-n-decamethylenebis(4-methylphenol) | 100 |
| 0.05% 2,2′-n-decamethylenebis(4-methyl-6-tert.-butylphenol) | 75 |
| 0.1% DLTDP plus 0.05% 2,2′-n-decamethylenebis(4-methyl-6-tert.-butylphenol) | 200 |
| 0.05% 4,4′-methylenebis(3-methyl-6-tert.-octylphenol) | 2 |
| 0.2% DLTDP plus 0.05% 4,4′-methylenebis(3-methyl-6-tert.-octylphenol) | 15 |
| 0.05% 4,4′-butylidenebis(3-methyl-6-tert.-octylphenol) | 6 |
| 0.2% DLTDP plus 0.05% 4,4′-n-butylidenebis(3-methyl-6-tert.-octylphenol) | 190 |
| 0.05% 4,4′-methylenebis(6-methylphenol) | 6 |
| 0.2% DLTDP plus 0.05% 4,4′-methylenebis(6-methylphenol) | 15 |
| 0.05% 4,4′-ethylidenebis(2,6-di-tert.-butylphenol) | 6 |
| 0.2% DLTDP plus 0.05% 4,4′-ethylidenebis(2,6-di-tert.-butylphenol) | 15 |

As can be observed from the data set out in Tables A and B above, combinations of bisphenols and dilauryl-3,3′-thiodipropionate are synergistic combinations with respect to the stabilization of polypropylene, the stabilizing effect of such combinations being substantially more than the additive stabilizing effect of the components of such combinations. Similar results are obtained if solid plastic grade polyethylene is substituted for the polypropylene.

Example 2

Several stabilizer combinations of the invention were evaluated by the method described in Example 1 in the stabilization of plastic grade solid polypropylene having a density of about 0.91, an average molecular weight greater than 15,000 and an inherent viscosity of about 1.46 as determined in Tetralin at 145° C. Dilauryl-3,3′-thiodipivalate was also included in the stabilization tests as a possible synergist for bisphenols. The results of the test are summarized by the data set out in Table C below. In Table C, the dilauryl-3,3′-thiodipropionate additive is indicated as "DLTDP" and the dilauryl-3,3′-thiodipivalate is indicated as "DLTDPV." The concentrations in Table C are based on the weight of the polypropylene.

TABLE C

| Additive | Oven life at 160° C., hours |
|---|---|
| None | 2 |
| 0.3% DLTDPV | 2 |
| 0.3% DLTDP | 3 |
| 0.1% 2,2'-methylenebis(4-methyl-6-tert.-butylphenol) | 15 |
| 0.2% DLTDP plus 0.1% 2,2'-methylenebis(4-methyl-6-tert.-butylphenol) | 30 |
| 0.1% 4,4'-n-butylidenebis(3-methyl-6-trrt.-butylphenol) | 15 |
| 0.3% DLTDP plus 0.1% 4,4'-n-butylidenebis(3-methyl-6-tert.-butylphenol) | 60 |
| 0.1% 2,2'-methylenebis[4-methyl-6-(1-methylcyclohexyl)phenol] | 60 |
| 0.3% DLTDPV plus 0.1% 2,2'-methylenebis[4-methyl-6-(1-methylcyclohexyl) phenol] | 60 |
| 0.3% DLTDP plus 0.1% 2,2'-methylenebis[4-methyl-6-(1-methylcyclohexyl) phenol] | 160 |

As can be observed from the data set out in Table C above, dilauryl-3,3'-thiodipivalate imparts no significant synergistic value to 2,2'-methylenebis[4 - methyl - 6 - (1-methylcyclohexyl)phenol], this illustrating the unexpectedness of the synergism between the closely related dilauryl-3,3'-thiodipropionate of the invention and bisphenols.

Example 3

The synergistic stabilizing effect of dilauryl-3,3'-thiodipropionate and 4,4'-n-butylidenebis(3 - methyl - 6-tert.-butylphenol) was determined in polyethylene by the method described in Example 1. The polyethylene employed was solid plastic grade having an average molecular weight greater than 15,000, a melt index of 7.59 and a density of about .91. The results are summarized by the date set out in Table D below. In Table D, dilauryl-3.3'-thiodipropionate is indicated as "DLTDP." The concentrations in Table D are based on the weight of the polyethylene.

TABLE D

| Additive | Oven life at 160° C., hours |
|---|---|
| None | 2 |
| 0.05% DLTDP | 7 |
| 0.05% 4,4'-n-butylidenebis(3-methyl-6-tert.-butylphenol) | 12 |
| 0.05% DLTDP plus 0.05% 4,4'-n-butylidenebis(3-methyl-6-tert.-butylphenol) | 30 |

Example 4

The synergistic stabilizing effect of 0.3% of several dialkyl-3,3'-thiodipropionates in combination with 0.5% 4,4'-n-butylidenebis(3 - methyl - 6 - tert. - butylphenol) or 0.05% 2,2'-methylenebis[4 - methyl - 6-(1-methylcyclohexyl)phenol] was determined in polypropylene by the method described in Example 1. The concentrations are based on the weight of the polypropylene. The polypropylene was a plastic grade polypropylene having a density of about 0.91, an average molecular weight greater than 15,000 and an inherent viscosity of 1.46 as determined in Tetralin at 145° C. The results are summarized by the data set out in Table E below.

TABLE E

| Alkylidenebisphenol | $S(CH_2CH_2COR)_2$, R | Oven Life at 160° C., hours |
|---|---|---|
| None | None | 2 |
| Do | n-Butyl | 2 |
| Do | n-Octyl | 3 |
| Do | n-Decyl | 3 |
| Do | Lauryl | 3 |
| Do | n-Octadecyl | 4 |
| 4,4'-n-butylidene-bis(3-methyl-6-tert.-butylphenol) | None | 3 |
| Do | n-Octyl | 17 |
| Do | n-Decyl | 18 |
| Do | Lauryl | 18 |
| Do | n-Octadecyl | 18 |
| 2,2'-methylenebis[4-methyl-6-(1-methylcyclohexyl)phenol] | None | 30 |
| Do | n-Butyl | 45 |
| Do | n-Octyl | 50 |
| Do | n-Decyl | 65 |
| Do | Lauryl | >114 |
| Do | n-Octadecyl | >114 |

Example 5

Samples of high density polyethylene, polypropylene, poly(3-methyl-1-butene) and poly(4-methyl-1-pentene) were slurried in an acetone solution containing various additives in varying proportions as summarized by the data set out in Table F below. The acetone was then evaporated leaving the various additives dispersed on the particles of poly-α-olefin. The resulting mixture was then blended by tumbling. The resulting composition was then molded into a plate and subjected to the oven storage test described above and checked frequently for peroxide formation. The oven life of the various samples is summarized by the data set out in Table F below. In Table F, the concentrations are based on the weight of the poly-α-olefin, and the term "MBC" refers to 2,2'-methylenebis[4-methyl-6-(1 - methylcyclohexyl)phenol]. The polyethylene samples had an inherent viscosity of 1.72 in Tetralin at 145° C., a density of 0.952 and a heat distortion temperature of 129° C. The polypropylene samples had an inherent viscosity of 3.12 in Tetralin at 145° C., a density of 0.919 and a Vicat softening point of 155° C. The poly(3-methyl-1-butene) samples had an inherent viscosity of 2.40 in Tetralin at 145° C., a density of 0.901 and a crystalline melting point of 235–245° C. The poly(4-methyl-1-pentene) samples had an inherent viscosity of 1.74 in Tetralin at 145° C., a density of 0.832 and a crystalline melting point of 200–205° C. All of the poly-α-olefins had a crystallinity of greater than 90% as determined by X-ray diffraction.

TABLE F

| Poly-α-olefin | $S(CH_2CH_2COR)_2$ R | Conc. percent | MBC conc., percent | Oven life at 160° C., hours |
|---|---|---|---|---|
| Poly(4-methyl-1-pentene) | None | | 0.1 | 40 |
| Do | Capryl | 0.01 | None | 0.2 |
| Do | do | 0.01 | 0.1 | 47 |
| Poly(3-methyl-1-butene) | None | | 0.1 | 39 |
| Do | n-Decyl | 2.9 | None | 20 |
| Do | do | 2.9 | 0.1 | >100 |
| Polypropylene | None | | 0.004 | 0.2 |
| Do | Lauryl | 0.001 | None | 0.2 |
| Do | do | 0.001 | 0.004 | 1 |
| Do | do | 0.033 | 1.0 | >100 |
| Polyethylene | Stearyl | 0.19 | 0.01 | 18 |
| Do | Lauryl | 0.01 | 0.19 | >100 |

As can be observed from the data set out in Table F, combinations of the thiodipropionates and 2,2'-methylenebis[4-methyl-6-(1-methylcyclohexyl)phenol] are more effective as stabilizers for poly-α-olefins at elevated temperatures than the mere additive effect of these stabilizer additives.

Example 6

Polyethylene and polypropylene samples as described in Example 5 were tested for stability having various additives of the invention incorporated therein including an organic phosphite. The polyethylene and polypropylene samples were evaluated as to stability at elevated temperatures by the oven life test described above and the stability is summarized by the data set out in Table G below. The organic phosphite used was tris(2-ethylhexyl) phosphite. In Table G, the concentrations are given on a weight basis and the term "MBC" refers to 2,2'-methylenebis[4-methyl-6-(1-methylcyclohexyl)phenol].

TABLE G

| Poly-α-olefin | R | S(CH$_2$CH$_2$COR)$_2$ Conc., percent | MBC Conc., percent | Phosphite conc., percent | Oven life at 160° C., hours |
|---|---|---|---|---|---|
| Polypropylene | | None | 0.025 | 0.05 | 10 |
| Do | Lauryl | 0.075 | None | 0.05 | 0.6 |
| Do | do | 0.075 | 0.025 | 0.05 | 46 |
| Do | | None | 0.05 | 0.05 | 27 |
| Do | Lauryl | 0.05 | None | 0.05 | 0.2 |
| Do | do | 0.05 | 0.05 | 0.05 | 75 |
| Polyethylene | | None | 0.1 | 0.1 | 60 |
| Do | Stearyl | 1.0 | None | 0.1 | <5 |
| Do | do | 1.0 | 0.1 | 0.1 | >100 |

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

I claim:
1. A composition comprising:
   (A) a poly-α-olefin derived from α-amino-olefinic hydrocarbons having 2 to 10 carbon atoms, and
   (B) a stabilizing amount of a stabilizer combination comprising
      (1) at least one diester of 3,3'-thiodipropionic acid having the formula

wherein each R is an alkyl radical having 4 to 20 carbon atoms, and
      (2) at least one bisphenol represented by one of the following formulae:

(I)
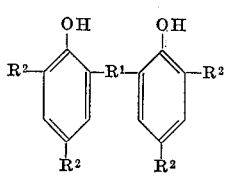

(II)
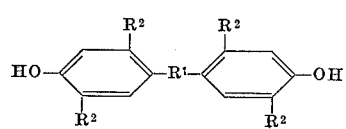

or (III)
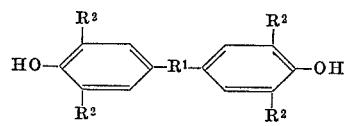

wherein
R$^1$ is an alkylene or alkylidene radical having 4 to 12 carbon atoms;
each R$^2$, independently, is a hydrogen atom, an alkyl radical having 1 to 12 carbon atoms, a 1-alkylcyclohexyl radical wherein the alkyl moiety has 1 to 4 carbon atoms, or a 1-alkylbenzyl radical wherein the alkyl moiety has 1 to 4 carbon atoms;
and provided that at least one R$^2$ on each aromatic ring is other than a hydrogen atom.

2. A composition according to claim 1 wherein said poly-α-olefin is polypropylene or polyethylene.

3. A composition according to claim 1 wherein said diester of 3,3'-thiodipropionic acid is dilauryl 3,3'-thiodipropionate and said bisphenol is 4,4'-butylidene bis(6-t-butyl-m-cresol).

4. A composition according to claim 1 wherein said diester of 3,3'-thiodipropionic acid and said bisphenol are each present in an amount in the range of about 0.001% to 5.0% based on the weight of said poly-α-olefin and also at a ratio to each other in the range of about 1:100 to 100:1.

5. A composition according to claim 1 wherein said bisphenol is represented by Formula I.

6. A composition according to claim 1 wherein said bisphenol is represented by Formula II.

7. A composition according to claim 1 wherein said bisphenol is represented by Formula III.

8. A composition comprising:
   (A) a poly-α-olefin derived from α-mono-olefinic hydrocarbons having 2 to 10 carbon atoms, and
   (B) a stabilizing amount of a stabilizer combination comprising
      (1) at least one diester of 3,3'-thiodipropionic acid having the formula

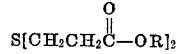

wherein each R is an alkyl radical having 4 to 20 carbon atoms, and
      (2) at least one bisphenol represented by one of the following formulae:

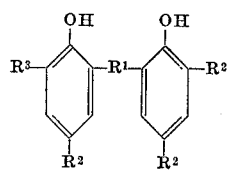

(II) 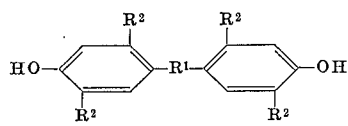

or (III) 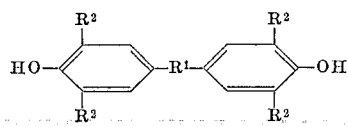

wherein
R¹ is an alkylene or alkylidene radical having 4 carbon atoms;
each R², independently, is a hydrogen atom, an alkyl radical having 1 to 12 carbon atoms, a 1-alkylcyclohexyl radical wherein the alkyl moiety has 1 to 4 carbon atoms, or a 1-alkylbenzyl radical wherein the alkyl moiety has 1 to 4 carbon atoms;
and provided that at least one R² on each aromatic ring is other than a hydrogen atom.

9. A solid poly-α-olefin composition comprising solid polyethylene, polypropylene, or copolymers thereof containing about .001% to 5% by weight based on the poly-α-olefin of dilauryl-3,3'-thiodipropionate and about .001% to 5% by weight based on the poly-α-olefin of 4,4'-n-butylidenebis(3-methyl-6-tert.-butylphenol).

10. A composition comprising:
(A) a poly-α-olefin derived from α-mono-olefinic hydrocarbons having 2–10 carbon atoms, and
(B) a stabilizing amount of a stabilizer combination comprising:
(1) at least one diester of 3,3'-thiodipropionic acid having the formula

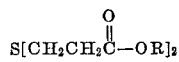

wherein each R is an alkyl radical having 4 to 20 carbon atoms, and
(2) 2,2'-methylenebis[4-methyl - 6(1-methylcyclohexyl)phenol].

11. A synergistic stabilizer system comprising a combination of:
(A) 1 to 100 parts at least one diester of 3,3'-thiodipropionic acid having the formula

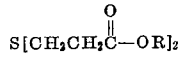

wherein each R is an alkyl radical having 4 to 20 carbon atoms, and
(B) 1 to 100 parts at least one bisphenol represented by one of the following formulae:

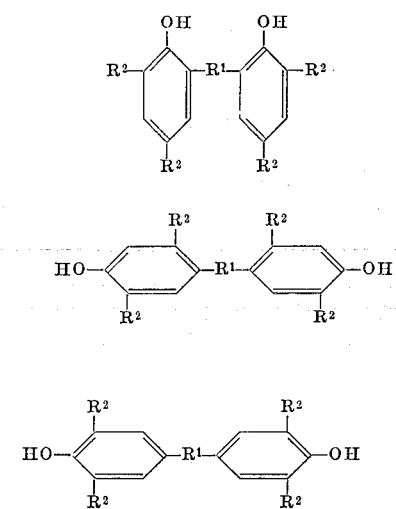

wherein
R¹ is an alkylene or alkylidene radical having 4 to 12 carbon atoms;
each R², independently, is a hydrogen atom, an alkyl radical having 1 to 12 carbon atoms, a 1-alkylcyclohexyl radical wherein the alkyl moiety has 1 to 4 carbon atoms, or a 1-alkylbenzyl radical wherein the alkyl moiety has 1 to 4 carbon atoms;
and provided that at least one R² on each aromatic ring is other than a hydrogen atom.

12. A synergistic stabilizer system according to claim 11 wherein R¹ and 4 carbon atoms.

13. A synergistic stabilizer system comprising a combination of (A) 1 to 10 parts dilauryl thiodipropionate and (B) 1 to 10 parts 4,4'-butylidenebis(3-methyl-6-tert-butyl-phenol).

References Cited
UNITED STATES PATENTS

| | | | |
|---|---|---|---|
| 2,519,755 | 8/1950 | Gribbins | 260—45.85 |
| 2,673,366 | 4/1954 | Pullman et al. | 260—45.95 |
| 2,748,096 | 5/1956 | Lambert et al. | 260—45.95 |
| 2,820,775 | 1/1958 | Chamberlin et al. | 260—45.95 |

HOSEA E. TAYLOR, JR., Primary Examiner

U.S. Cl. X.R.

252—404; 260—45.7, 45.95

PO-1050
(5/69)

UNITED STATES PATENT OFFICE
CERTIFICATE OF CORRECTION

Patent No. 3,487,044      Dated December 30, 1969

Inventor(s) Clarence E. Tholstrup

It is certified that error appears in the above-identified patent and that said Letters Patent are hereby corrected as shown below:

Column 5, line 50, "millilters" should read --milliliters--. Column 6, Table A, the twelfth item should read --0.1% DLTDP plus 0.05% 4,4'-n-butylidenebis[3-methyl-6-(1-methylbenzyl)-phenol]--. Column 7, Table C, the sixth item should read --0.1% 4,4'-n-butylidenebis(3-methyl-6-tert.-butylphenol)--. Column 7, line 32, "date" should read --data--. Column 7, line 47, "0.5%" should read --0.05%--. Column 8, Table F, the formula in the heading should read $$--S(CH_2CH_2\overset{O}{\overset{\|}{C}}OR)_2--.$$

Column 9, line 48, "α-amino-olefinic" should read --α-mono-olefinic--. Column 10, lines 70-75, the formula should read

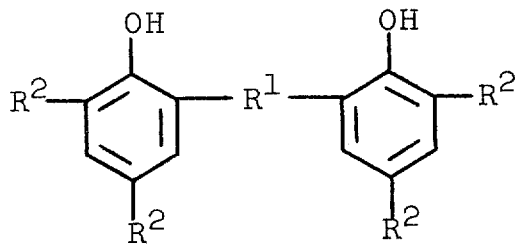

SIGNED AND
SEALED
JUL 28 1970

(SEAL)
Attest:

Edward M. Fletcher, Jr.
Attesting Officer

WILLIAM E. SCHUYLER, JR.
Commissioner of Patents